(12) United States Patent
Abhyankar et al.

(10) Patent No.: US 8,539,343 B2
(45) Date of Patent: Sep. 17, 2013

(54) CALCULATING UNIQUENESS COEFFICIENTS FOR DATA OBJECTS AND DISPLAYING THE DATA OBJECTS IN A LAYOUT BASED ON THE UNIQUENESS COEFFICIENT

(75) Inventors: Saurabh Abhyankar, Levallois Perret (FR); Jean Luc Agathos, Paris (FR); Adam Binnie, Bowen Island (CA); Virgile Chongvilay, Boissy Saint Leger (FR); Nicolas Mourey, Fleury en Biere (FR)

(73) Assignee: SAP France S.A., Levallois-Perret (FR)

( * ) Notice: Subject to any disclaimer, the term of this patent is extended or adjusted under 35 U.S.C. 154(b) by 336 days.

(21) Appl. No.: 12/335,546

(22) Filed: Dec. 16, 2008

(65) Prior Publication Data

US 2010/0153840 A1    Jun. 17, 2010

(51) Int. Cl.
*G06F 17/00*     (2006.01)

(52) U.S. Cl.
USPC .......................................................... 715/243

(58) Field of Classification Search
USPC ................. 715/27, 204, 243, 253, 503, 505, 715/506, 517; 707/3, 5, 100, 101, 102, 103, 707/104
See application file for complete search history.

(56) References Cited

U.S. PATENT DOCUMENTS

| | | | |
|---|---|---|---|
| 7,000,182 B1 * | 2/2006 | Iremonger et al. | 715/235 |
| 7,231,599 B2 * | 6/2007 | Yamada et al. | 715/246 |
| 7,254,581 B2 * | 8/2007 | Johnson et al. | 707/627 |
| 7,493,330 B2 * | 2/2009 | Cubranic | 1/1 |
| 2007/0156678 A1 * | 7/2007 | Ashkenazi et al. | 707/5 |
| 2007/0239508 A1 * | 10/2007 | Fazal et al. | 705/8 |
| 2008/0104053 A1 * | 5/2008 | Cubranic | 707/5 |
| 2008/0104060 A1 * | 5/2008 | Abhyankar et al. | 707/5 |
| 2009/0043759 A1 * | 2/2009 | Danish et al. | 707/5 |

OTHER PUBLICATIONS

Coffey, Prosser, FileMaker Pro 9: The Missing Manual (O'Reilly Media, Aug. 2, 2007) pp. 77, 136-138, 148, 179, 181-186,193, 255-258.*

Jost L. Entropy and diversity. Oikos [serial online]. May 2006;113(2):363-375. Available from: Academic Search Premier, Ipswich, MA. Accessed Aug. 10, 2012.*

William Pugh, Grant Weddell; Two-directional record layout for multiple inheritance; Proceedings of the ACM SIGPLAN 1990—Conference on Programming language design and implementation (White Plains, New York, United States); pp. 85-91; Year of Publication: 1990; ACM New York, NY, USA (1990): (http://portal.acm.org/citation.cfm?id=93556&coll=portal&dl=ACM).

* cited by examiner

*Primary Examiner* — Doug Hutton, Jr.
*Assistant Examiner* — Scott M Kelly

(57) ABSTRACT

Data records with one or more data objects are displayed according to layout rules on a computer user interface. The data objects associated with the record are identified, layout rules for the one or more data objects of the record are accessed and a layout is calculated based at least in part a uniqueness coefficient of the one or more data objects. The data objects are then displayed on the computer interface according to the determined layout.

14 Claims, 5 Drawing Sheets

CALCULATING UNIQUENESS COEFFICIENTS FOR DATA OBJECTS AND DISPLAYING THE DATA OBJECTS IN A LAYOUT BASED ON THE UNIQUENESS COEFFICIENT

FIELD OF THE INVENTION

The invention generally relates to optimizing visual presentation of data records on a computer user interface.

BACKGROUND OF THE INVENTION

Business intelligence data presents many challenges to user interface designers trying to find an optimal way for displaying data on a display. By nature, business intelligence data tends to be voluminous not to mention contextual data based on factors such as, a given user, a given business scenario, a given geography, etc. Many business intelligence tools including navigation tools, such as Polestar by Business Objects, an SAP company, provide flexible platforms for filtering and displaying complex data records to fit the needs of a casual business user.

Navigation tools and other business intelligence applications allow a user to explore data by selecting filter values to narrow the record sets of interest to them. Once they have identified records of interest, the users want to be able to display details or data objects that make up the records in a way that is meaningful and logical. However, users have to also contend with limitations such as space constraints on the screen and limited span of a viewer's attention.

The need to optimize the views of data records is more pronounced for records that have many data objects to be displayed. For instance, the current techniques use a simple table to display a record without any intelligence as to how the various parts of the record should be displayed. Some applications allow manual configuration to define how the record should be displayed. This experience can be made easier for the user without the user having to manually prepare or configure the layout for displaying the records.

SUMMARY OF THE INVENTION

Disclosed are methods and systems to display a data record according to a layout in data visualization with one or more data objects on a computer user interface. The methods and systems further involve identifying one or more data objects associated with the record, accessing layout rules for the one or more data objects of the record, calculating a uniqueness coefficient for the one or more data objects, and determining a layout for the record based on layout rules. In one aspect, the layout rules may comprise at least one condition for choosing how and where to display an object based on a measure of how unique that data object is. One such measure is a uniqueness coefficient of the one or more data objects and the record on the computer user interface is displayed according to the layout that takes uniqueness of the data objects into consideration. In yet another aspect, the uniqueness coefficient is used in conjunction with other factors such as the data types of the data objects in determining the display layout.

Additional features and advantages will be made apparent from the following detailed description of illustrated embodiments, which proceeds with reference to the accompanying drawings.

BRIEF DESCRIPTION OF THE DRAWINGS

A better understanding of embodiments of the invention are illustrated by examples and not by way of limitation, the embodiments can be obtained from the following detailed description in conjunction with the following drawings, in which.

DETAILED DESCRIPTION

Complex data sets are made of a number of data records, each record itself is generally comprised of one or more data objects. The data objects are grouped together to form the record at least in part by applying filters to the data set via queries (e.g., Structured Query Language (SQL) queries and Multidimensional Expressions (MDX) queries) to request the records of interest. Once retrieved, the user may be interested in viewing these records but voluminous records need to be displayed on a user interface in a meaningful and logical way. In one aspect, the record can be displayed on a user interface according to a layout that defines or outlines the physical placement of the various details or parts of record. The layout can be determined dynamically according to layout rules. Thus, disclosed herein are methods and systems to display a record with one or more data objects according to layout rules which are applied dynamically without user intervention.

Figure 1:
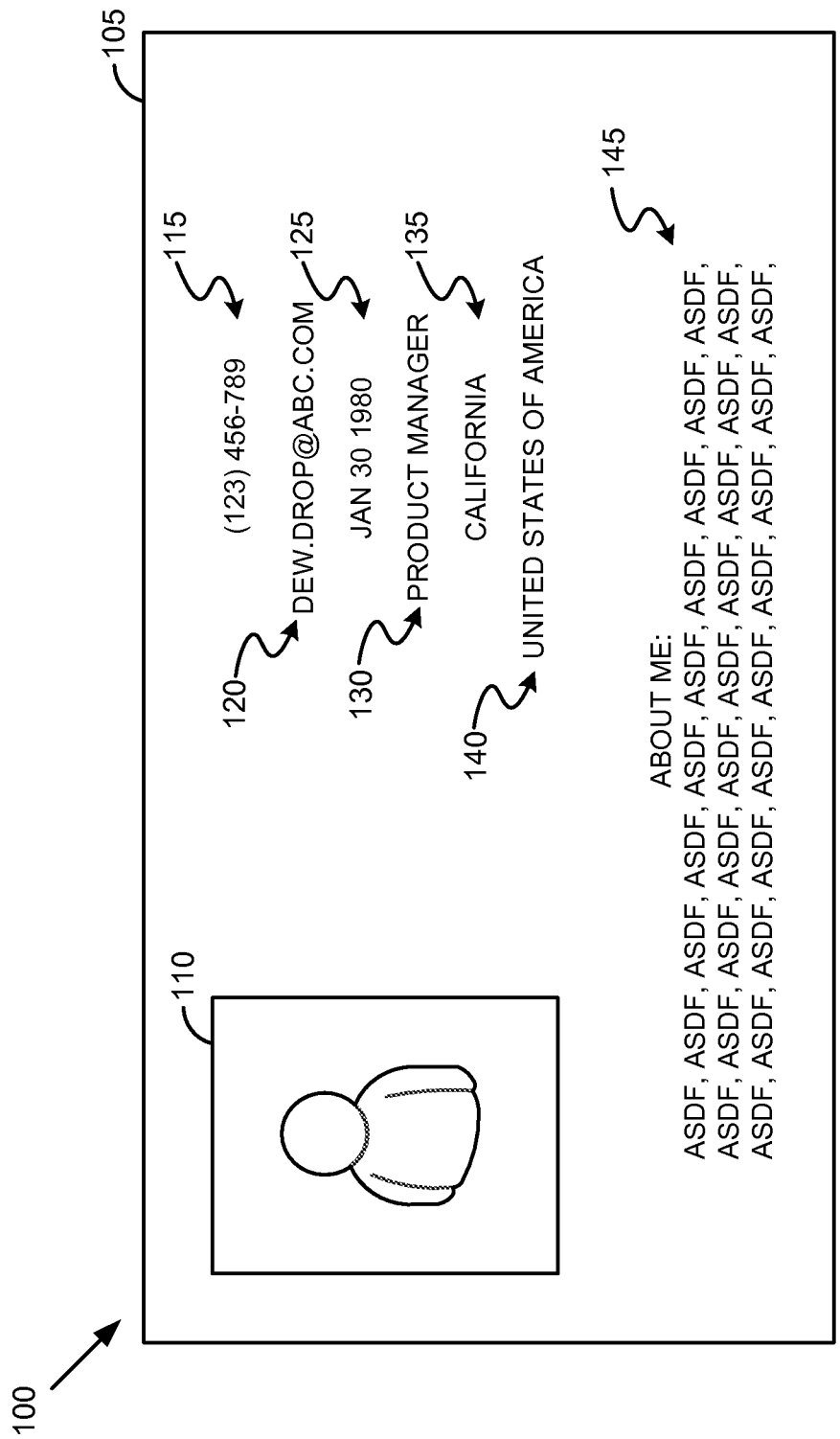
FIG. 1 is an exemplary block diagram illustrating a layout of the record according to an embodiment of the invention.

FIG. 1 is an exemplary block diagram illustrating a layout 105 of a record 100 according to an embodiment of the invention. The record 100 is an example record of an employee. Layout 105 of the employee record 100 includes physical placements or locations for data objects (e.g., photo image of the employee at 110) or other details such as employee contact number 115, email ID 120, joining date 125, designation 130, place of business 135 and country of business 140 (e.g., (123)456-789, DEW.DROP@ABC.COM, Jan 30 1980, product manager, California, United States of America respectively). The records to be displayed may be of several different data types including long strings of data such as "about me" at 145. According to one embodiment, the layout 105 is a result of applying layout rules which when applied to the record specify how a record should look when it is displayed. Layout rules may comprise a set of distinct rules that are, in one embodiment, correspondingly applied to each of the details or the data objects that make up the record. In one embodiment, some of the rules can be statically defined during configuration and applied dynamically based on conditions determined at runtime.

Data sets are typically made of data objects of various data types and can be categorized accordingly. For instance, in the layout 105 the phone number data object 115 is of alphanumeric data type having a value of (123)456-789 and categorized as a phone number, the designation data object 130 is a string type having a value "product manager" and categorized as a designation and so on. Thus, besides the actual value representing a data object, some metadata, that is data about the data objects, is also generally available in data stores.

Such metadata could include, but is not limited to, a data type (e.g., string, integer, user defined complex data type) of the data object, data categories the data can be classified under, and information related to distribution of the data object within a data entity (e.g., record sets, data sets, data store, data source, etc.), for instance. Layout rules defining how the various data objects of a record should be displayed could be based on such metadata. For instance, where a data object is displayed in a layout could depend on its data type. Image data types 110 could be configured to be displayed in the left corner of the layout 105. String type data objects that are short can be configured to be displayed next to the image, long string data types below the images and any short string data types of the record. Determining what is a long string or a short string is configurable. For instance, any string longer than 50 characters could be designated as a long string and anything shorter than 50 characters can be designated to be a short string.

In another aspect, the layout rules applied to a data object are based not only on the data type of the data object but some information about distribution of the data object as well. Distribution data about data objects could be based on a measure of entropy of the data sets containing the data objects. Entropy is a measure of disorder or randomness in a system and it is derived from information theory. Based on the entropy measure of a data set, merit values can be calculated for the various data objects comprising the data set. The merit value being directly proportional to the entropy and inversely proportional to the number of distinct values associated with the data categories within a data set. Thus, merit can be described as being inversely proportional to a uniqueness coefficient associated with a data object. The U.S. patent application with Ser. No. 11/555,234, titled "Apparatus and method for categorical filtering of data", filed on Oct. 31, 2006 and assigned to the same assignee as the subject application describes one such method of calculating information entropy of a system and the associated merit values. U.S. application with Ser. No. 11/555,234 is incorporated herein by reference. The merit value may be calculated by normalizing a product of (i) the entropy measure of the data set (which is calculated by calculating entropies of the categories within the data set) and (ii) a coverage of the category containing the data object. The coverage of the category containing the data object may be determined by a percentage of attributes in the category containing the data object. Typically, the entropy measure of the data set is multiplied by the coverage of the category containing the data object to determine the corresponding product of entropy and coverage for the data object. The product of entropy and coverage may be normalized to obtain the merit value of the respective data object. Therefore, the merit value is proportional to the entropy and the coverage, and inversely proportional to the number of distinct attributes (uniqueness coefficient) associated with the data object. In one embodiment, normalization may be performed by dividing the entropy-coverage product by a normalizing value z that is correlated with n, the distinct number of attributes in the category. In one embodiment z is monotonic in n. In one embodiment where z is monotonic in n, z is super linear in n. In one embodiment where z is super linear in n, z is equal to n log(n). Examples of the logarithm's base include 2, e (i.e., 2.718281828 where $\log_e$ is denoted ln) and 10. In one embodiment where z is monotonic in n, z is linear in n. In one embodiment where z is linear in n, z is equal to n. In one embodiment, the value of n is determined from an attribute count data structure.

The uniqueness coefficient is inversely proportional to merit. Thus, if a data object has a lower merit then the uniqueness coefficient of the data object is high. In one embodiment, the layout rules comprise rules for displaying data objects according to the uniqueness coefficient associated therewith. Meaning, the data object with the lower merit and higher uniqueness coefficient is displayed first in the layout of the record. In other embodiments, the least unique data object could be displayed first. In other embodiments, the layout rule could be a combination of data types (e.g., whether it is an image, string etc) and the uniqueness coefficient associated with the data objects. Each data object has a uniqueness coefficient associated with it. Referring to FIG. 1, for instance, a rule specifying that all image type data objects be displayed to the left of the screen causes image data 110 to be displayed to the left of the layout 105 whereas a rule specifying the data objects with high uniqueness coefficients be displayed on the top to the right causes the phone number object 115 and the email address object 120 to be displayed as shown.

Figure 2:
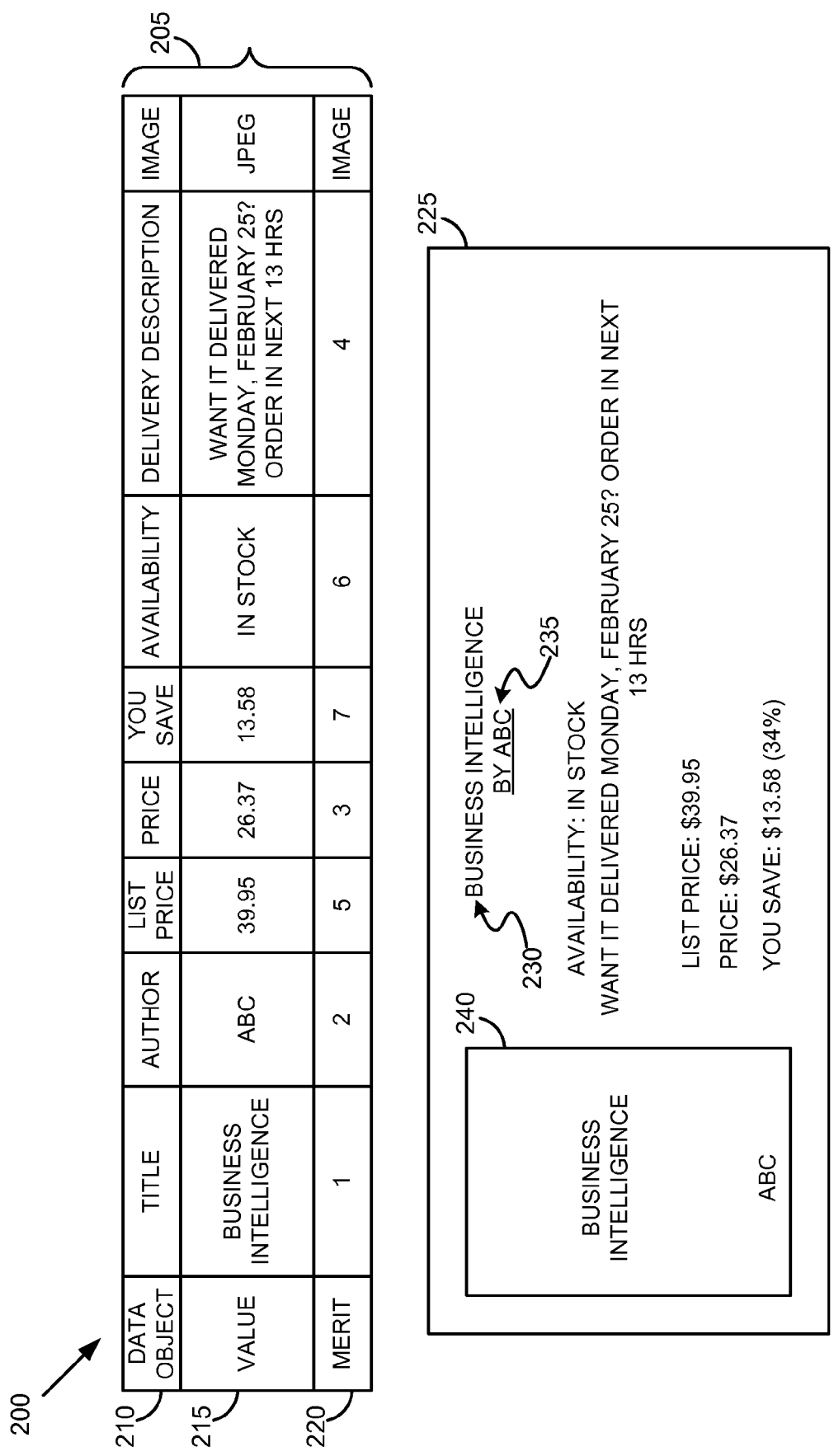
FIG. 2 is an exemplary block diagram illustrating a layout of the record based on layout rules and uniqueness coefficients according to an embodiment of the invention.

FIG. 2 is a block diagram illustrating visualizations or displays of a record based on layout rules and uniqueness coefficients according to an embodiment of the invention. Consider a business scenario 200 displaying a record of a book. The record 205 comprises data objects 210, values 215 and metadata associated with the data objects such as merit 220 of the data objects. Row 210 displays categories of data objects namely "title", "author", "list price", "price", "you save", "availability", "delivery description" and "image". The values associated with the data objects are as shown in row 215. The uniqueness coefficient is determined as an inverse of the merit measure listed in row 220.

In the business scenario 200, the data object "title" has the lowest merit meaning, the "title" has the highest uniqueness coefficient. Therefore, data object "title" of the book is displayed first as a first data object according to the rule requiring data objects with high uniqueness coefficients to be displayed higher. Row 220 displays the merit of the data objects for the record 205 of the book. Data object "author" has the second lowest merit, 2. Therefore data object "author" has the second highest uniqueness coefficient. The layout 225 shows some of the data objects (e.g., title 230 and author 235) displayed in descending order of the uniqueness coefficient values. However not all layout rules rely solely on the uniqueness values. Some may depend on other factors such as data types. For instance, the image type object at 240 is displayed in the upper left corner because the layout rule for the image may be to display the image in the left most corner of the layout.

Figure 3:
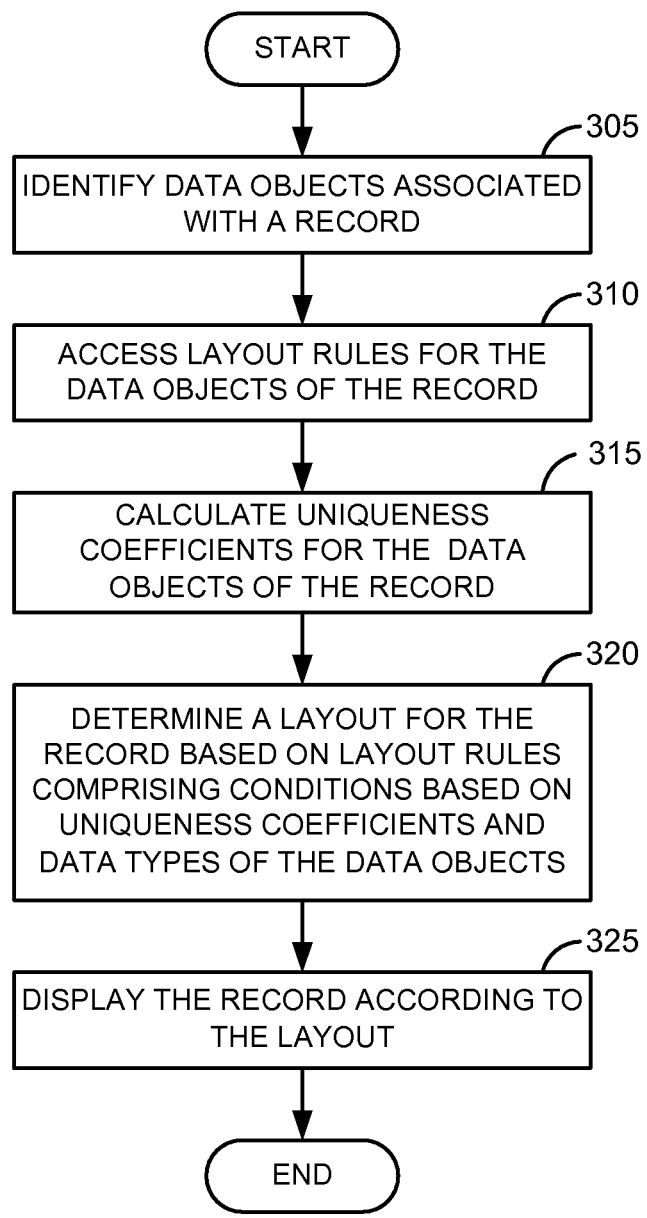
FIG. 3 is a flow diagram illustrating an exemplary process for displaying a record with one or more data objects according to specific layout rules.

FIG. 3 is a flow diagram illustrating an exemplary process for displaying data records with one or more data objects according to specific layout rules. The method comprises identifying data objects associated with a record at process block 305. At process block 310, layout rules for the data objects of the record are accessed. In one embodiment, along with access to the data objects themselves, metadata of the data objects can also be made available. Based on the retrieved metadata, at 315, uniqueness coefficients for the data objects are calculated. Alternatively, the uniqueness coefficient may have been previously calculated and stored as part of the metadata of the objects and retrieved at the time of determining a layout. At process block 320, a layout of the record is determined according to layout rules comprising uniqueness coefficients and data types of the data objects. The layout of the record is displayed at process block 325. In one embodiment, each data object is placed according to one or more elements of the layout rules wherein at least one of the layout rules includes a placement condition based on the uniqueness coefficient of the data objects. In other embodiments, layout rules comprise at least placement conditions based at least in part on the data types of the data objects. In other embodiments, layout rules may be written so that if there are conflicting layout rules at least one rule is given precedence over other rules that might apply to the data object in question.

Figure 4:
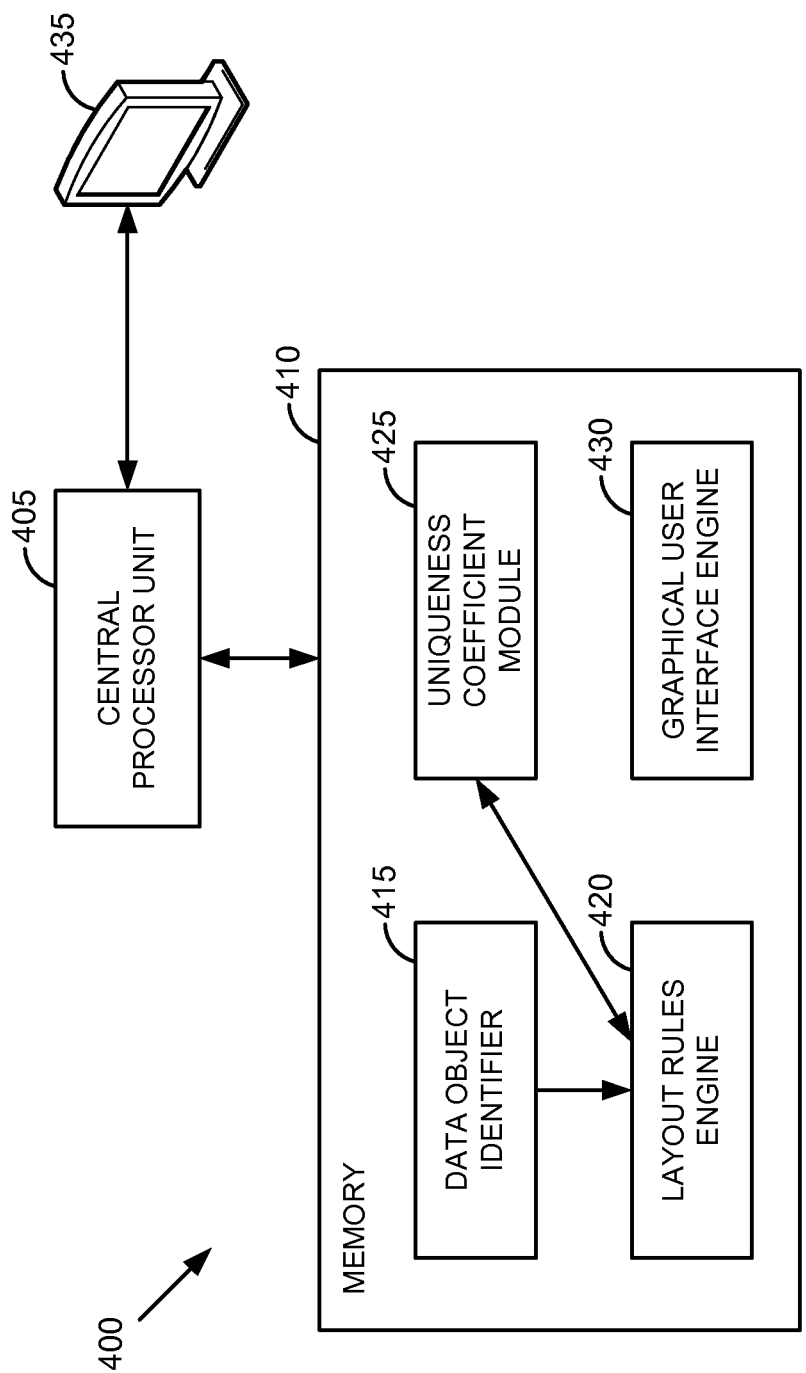
FIG. 4 is a block diagram of an exemplary computer system for displaying a record with one or more data objects according to specific layout rules.

FIG. 4 is a block diagram of an exemplary computer system operable for displaying a data record with one or more data objects according to specific layout rules. The computer system 400 includes standard components, including a central processing unit 405, a memory 410 and a display 435. The computer system 400 may also include input/output devices such as a keyboard, mouse, touch screen, printer (not shown), and the like.

The memory 410 of the computer system 400 comprises a data object identifier 415 comprising instructions that when executed by the processor identify the one or more data objects associated with a record. The one or more data objects of the record include details associated with the record. On completion of the identification of the one or more data objects, layout rules are accessed from the layout rules engine 420. The layout rules may be displaying an image at the left corner of the layout, displaying a short string next to the image, displaying long string below the image and short string of the record. A uniqueness coefficient is retrieved from a uniqueness coefficient module 425 operable for calculating the uniqueness coefficients. For example, in the employee record, data object "email" of the employee is more unique than data object "country" of the employee as there may be many employees in the same country but an email ID associated with the employee will most likely be unique to him or her. Therefore in such a scenario data object "email" of the employee data has a higher uniqueness coefficient.

Based on the layout rules and the uniqueness coefficient, the layout of the record is determined and the record is displayed on a graphical user interface 430.

Figure 5:
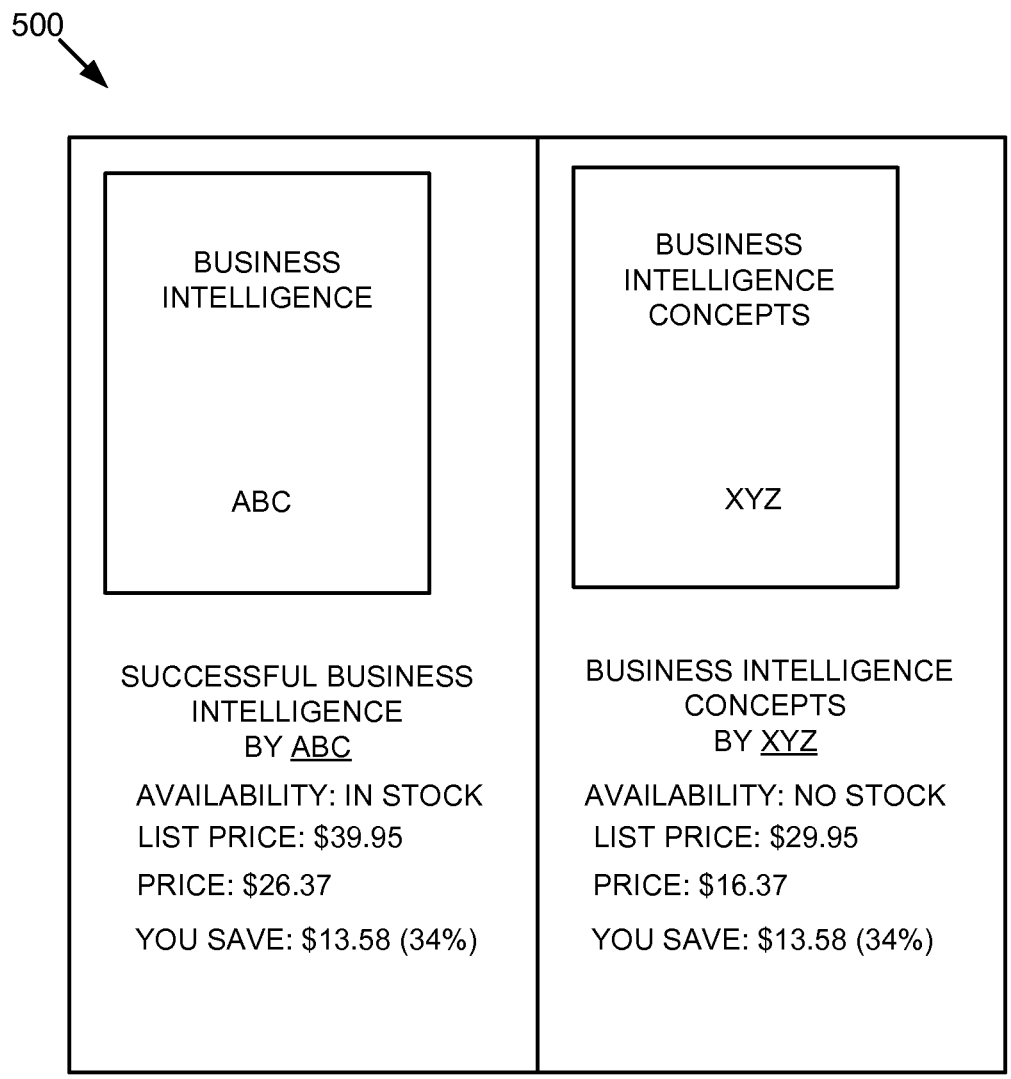
FIG. 5 is an exemplary block diagram illustrating a layout of displaying multiple records according to an embodiment of the invention.

FIG. 5 is an exemplary block diagram illustrating a layout of displaying multiple records according to an embodiment of the invention. Consider a business scenario 500, where a user searching for a book enters a search query as "business intelligence." The navigation tool displays books related to business intelligence. In the business scenario 500, the search result displays two books in response to the user's search query. The layout rules applied to multiple record displays may be different from the layout rules applied for a single record display. In the multiple record display, the layout rules may be to display short string and long string below one another. Preferably, any long string data types are displayed after short string data types. Again other data objects like "price", "list price" and "you save" will be displayed based on the uniqueness coefficient. In an embodiment, the layout rules for displaying search results for a search query may also include rules to display multiple items in a row. In an embodiment, the layout rules for displaying search results for a search query may also include rules to display multiple items in a column. The display of the record is also based on the uniqueness coefficient and data types of the data objects.

Elements of the invention may also be provided as a tangible machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other types of tangible machine-readable media suitable for storing electronic instructions.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. For instance, the detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

What is claimed is:

1. A computer implemented method for displaying a data record comprising one or more data objects on a computer user interface, the method comprising:
   identifying the one or more data objects associated with the record;
   calculating an entropy measure associated with a data set comprising the one or more data objects;
   calculating a coverage associated with each of the one or more data objects;
   determining a product of the measure of the data set and the corresponding coverage associated with each data object;
   normalizing the product of the entropy measure of the data set and the corresponding coverage associated with each data object;
   determining a merit value for each data object, wherein the merit value is the normalized product of the entropy measure of the data set and the corresponding coverage associated with respective data object;
   calculating a uniqueness coefficient for each of the one or more data objects based upon their determined merit value, wherein the uniqueness coefficient is inversely proportional to the merit value;
   accessing layout rules for the one or more data objects of the record;
   determining a layout for the record on the accessed layout rules, wherein the layout rules comprise at least one condition based on the uniqueness coefficients of the one or more data objects and wherein the layout defines physical placement of the one or more data objects within the layout of the record; and
   displaying the record on the computer user interface according to the layout.

2. The method of claim 1, wherein the layout rules further comprise at least one rule having a condition based at least in part on data types corresponding to the data objects.

3. The method of claim 2, wherein the at least one rule having the condition based at least in part on the data types corresponding to the data objects comprises displaying image data types at a corner of the layout.

4. The method of claim 2, wherein the at least one rule having the condition based at least in part on the data types corresponding to the data objects comprises a rule to display short string types next to image data types.

5. The method of claim 2, wherein the at least one rule having the condition based at least in part on the data types corresponding to the data objects comprises a rule to display long string data types below image data types and short string data types.

6. The method of claim 1, wherein the layout rules comprise placing data objects of the record in the layout in descending order of their respective uniqueness coefficients.

7. A computer system for displaying a record comprising or more data objects on a computer user interface, the system comprising;
- a processor;
- a data object identifier to identify the one or more data objects;
- a uniqueness coefficient module to:
  - calculate an entropy measure associated with a data set comprising the one or more data objects;
  - calculate a coverage associated with each of the one or more data objects;
  - determine a product of the measure of the data set and the corresponding coverage associated with each data object;
  - normalize the product of the entropy measure of the data set and the corresponding coverage associated with each data object;
  - determine a merit value for each of the one or more data objects as the normalized product of the entropy measure of the data set and the corresponding coverage associated with respective data object; and
  - calculate uniqueness coefficients for each of the one or more data objects based upon their determined merit value, wherein the uniqueness coefficient is inversely proportional to the merit value;
- a layout rules engine in communication with the data object identifier and uniqueness coefficient module, the layout rule engine operable to:
  - access layout rules for the one or more data objects; and
  - determine a layout for the record based on the layout rules, wherein the layout rules comprise at least one condition based on the uniqueness coefficients corresponding to the one or more data objects and at least one condition based at least in part on data types corresponding to the data objects and wherein the layout defines physical placement of the one or more data objects within the layout of the record; and
- a graphical user interface operable for displaying the record according to the layout.

8. The computer system of claim 7, wherein the layout rules comprising the at least one condition based at least in part on data types corresponding to the data objects comprises displaying image data types at a corner of the layout.

9. The computer system of claim 7, wherein the layout rules comprising the at least one condition based at least in part on data types corresponding to the data objects comprises displaying short string types next to image data types.

10. The computer system of claim 7, wherein the layout rules comprising the at least one condition based at least in part on data types corresponding to the data objects comprises displaying long string data types below image data types and short string data types.

11. An article of manufacture, comprising:
A nontransitory machine readable medium having instructions which when executed by a machine cause the machine to perform operations comprising:
- identifying one or more data objects associated with the record;
- calculating an entropy measure associated with a data set comprising the one or more data objects;
- calculating a coverage associated with of the one or more data objects;
- determining a product of the entropy measure of the data set and the corresponding coverage associated with each data object;
- normalizing the product of the entropy measure of the data set and the corresponding coverage associated with each data object;
- determining a merit value for each data object, wherein the merit value is the normalized product of the entropy measure of the data set and the corresponding coverage associated with respective data object;
- calculating a uniqueness coefficient for each of the one or more data objects based upon their determined merit value, wherein the uniqueness coefficient is inversely proportional to the merit value;
- accessing layout rules for the one or more data objects of the record;
- determining a layout for the based on the accessed layout rules, wherein the layout rules comprise at least one condition based on the uniqueness coefficients of the one or more data objects and wherein the layout defines physical placement of the one or more data objects within layout of the record; and
- displaying the record on the computer user interface according to the layout.

12. The article of manufacture in claim 11, wherein the layout rules comprise placing data objects of the record in the layout in descending order of their respective uniqueness coefficients.

13. The article of manufacture in claim 11, wherein the layout rules further comprises at least one rule having a condition based at least in part on data types corresponding to the data objects.

14. The article of manufacture in claim 13, wherein the at least one rule having the condition based at least in part on the data types corresponding to the data objects comprises displaying image data types at a corner of the layout.

* * * * *